Patented Apr. 2, 1935

1,996,643

UNITED STATES PATENT OFFICE 1,996,643

IMPROVED ELECTRODE AND METHOD OF MAKING SAME

Lee De Pree, Midland, Mich., assignor to The Dow Chemical Company, Midland, Mich., a corporation of Michigan No Drawing. Application August 10, 1931, Serial No. 556,335

4 Claims. (Cl. 204—4)

The present invention concerns an improved article of manufacture and a method for making the same, such article being composed of carbon, graphite or graphitized carbon impregnated with rosin (colophony) and being suited for the following uses:—As a part of a battery or electrolytic cell, as a material for use in apparatus to resist chemical attack, as an impervious material, and particularly as an anode in a cell used for the electrolysis of an alkali metal halide solution.

A carbon or graphite electrode, when used in a process for electrolyzing alkali metal halide solutions, tends to absorb the salt solution, halogen and oxygen are liberated within the voids of the electrode and as a result the latter becomes oxidized throughout and disintegrates. In order to prevent such action, it is general practice to impregnate the electrode with paraffin oils, drying oils or waxes, etc., prior to using them in the aforementioned process. It has been found that such treatment lengthens the active life of an electrode appreciably.

Although treatment of electrodes, in the manner described above, decreases the diffusion of brine through the same and in general improves their quality, certain disadvantages result from such practice. During use of the so treated electrodes in a process for electrolyzing alkali metal chlorides, for instance, the oil with which they are impregnated becomes partially chlorinated and tends to swell, with the result that the electrodes sweat oil and at the same time crumble or wear away. The oil or wax so liberated from the electrodes proves further disadvantageous in that it tends to foul and obstruct the cell diaphragm and passages, thereby interfering with the conduct of the process as a whole.

I have now found that a carbon, graphite or graphitized carbon article, impregnated with rosin (colophony), is more resistant to corrosion when used as an electrode in an electrolytic process, than is a similar electrode impregnated with any of the other materials mentioned. An electrode, impregnated with rosin, is further advantageous in that rosin melts at a temperature higher than that ordinarily reached during operation of an electrolytic cell of the type mentioned, and during cell operation, such electrode does not liberate materials to obstruct the diaphragm of the cell. I have found that a so impregnated carbon article is well adapted for uses where an impervious carbon body is desired and in which uses rosin is not materially or injuriously acted upon by reagents or heat. Rosin-impregnated carbon in various forms is suitable for concentration towers, distillation columns, vats, parts of apparatus subject to attack resistable by carbon and rosin, and may be substituted for metals, stone, rubber, glass and wood in a wide variety of uses. The present invention, then, consists in an improved carbon, graphite or graphitized carbon article impregnated with rosin and in a method for preparing the same, such article and method of manufacture being hereinafter fully described and particularly pointed out in the claims.

The following description sets forth in detail but one of the various modes of procedure which may be employed in preparing my improved article of manufacture, it being understood, however, that such description is purely illustrative and is not to be construed as a limitation on the invention.

A carbon, graphite or graphitized carbon article, which may or may not be first evacuated to remove most of the air from the voids of the same, is immersed in molten pine rosin at any temperature between the melting point and vaporization point of the latter, but preferably at a temperature between 175° and 200° C. A pressure above atmospheric is preferably, but not necessarily, applied during immersion, the purpose of such pressure being to force the rosin into the voids of the electrode. The article is withdrawn from the bath and excess rosin removed from its surface, preferably by permitting the article to drain while still hot. In preparing my improved article according to the above described method, the rosin with which said article is impregnated may advantageously be dissolved in a suitable solvent, e. g. China-wood oil, linseed oil, etc., the article being more readily and completely impregnated when such solvent is used.

In order to compare the corrosion which graphite electrodes, impregnated with various materials, suffer when used as anodes in an electrolytic process of the oxidation-reduction type, the following test was made.

A cell was prepared by filling a battery jar, 20.3 centimeters in diameter and 20.3 centimeters deep, with a solution consisting of 1 kilogram of potassium bromide dissolved in 3.5 kilograms of water, suspending a graphite cathode in the center of the solution and, equidistant both from the cathode and from each other, suspending six graphite anodes, each impregnated with a different material. Each anode was in the form of a cylindrical graphite rod, 20.3 centimeters long and having a volume of 63.9 cubic centimeters. The anodes were each immersed in the cell solution to a depth of 17.2 centimeters. Each anode was connected in series with an individual variable resistance and each such system, consisting of an anode and its variable resistance, was connected in parallel with all similar systems used in the cell. The cell was operated continuously at a temperature between 70° and 75° C. during a period of five weeks. During said operation, the potential drop over the cell as a whole was 100 volts and each of the above-mentioned variable resistances was so adjusted that a current of 2 amperes passed through each anode at all times. The volume of each anode was measured both before and after being tested, the decrease in volume being taken as the measure of corrosion.

Table

| Graphite anode impregnated with— | Percentage of impregnation material absorbed, based on weight of unimpregnated anode | Volume of anode after corrosion test—cubic centimeters | Decrease in volume of anode (due to corrosion) cubic centimeters |
|---|---|---|---|
| Not impregnated | | 25.7 | 38.2 |
| Concentrated sodium silicate solution | 6.6 | 19.2 | 44.7 |
| Chlorinated paraffin oil | 5.3 | 31.5 | 32.4 |
| 50 percent solution (by weight) of China-wood oil in kerosene | 10.9 | 30.3 | 33.6 |
| China-wood oil | 6.8 | 24.5 | 30.4 |
| Linseed oil | 4.6 | 28.3 | 35.6 |
| Rapeseed oil | 9.3 | 24.2 | 30.7 |
| Cottonseed oil | 13.6 | 23.2 | 40.7 |
| Rosin | 3.7 | 52.2 | 11.7 |
| Rosin | 2.5 | 52.0 | 11.9 |
| 50 percent solution (by weight) of rosin in China-wood oil | 5.2 | 47.7 | 16.2 |

It will be noted from data given in the preceding table that graphite electrodes impregnated with rosin are corroded to a much lesser extent than are similar electrodes impregnated with the other materials tested. Under conditions maintained during such tests, the electrodes have been exposed to oxidizing conditions more severe than would be experienced during the electrolysis of an alkali metal chloride solution.

Other forms of applying the principle of my invention may be employed instead of the ones here explained, change being made in the method or composition, provided the steps or ingredients stated by any of the following claims or the equivalent of such stated steps or ingredients be employed.

I therefore particularly point out and distinctly claim as my invention:—

1. An improved shaped article of manufacture composed of carbon, graphite or graphitized carbon impregnated with rosin and a drying oil, said article being highly resistant to oxidation at ordinary temperatures.

2. An improved shaped article of manufacture composed of carbon, graphite or graphitized carbon impregnated with rosin and China-wood oil, said article being highly resistant to oxidation at ordinary temperatures.

3. As an article of manufacture, a carbon, graphite or graphitized carbon electrode impregnated with rosin and a drying oil.

4. As an article of manufacture, a carbon, graphite or graphitized carbon electrode impregnated with rosin and China-wood oil.

LEE DE PREE.